United States Patent [19]

O'Neal

[11] Patent Number: 5,064,157

[45] Date of Patent: Nov. 12, 1991

[54] MOUNTING BRACKET FOR HANDLEBAR CROSSBAR

[75] Inventor: James M. O'Neal, Chatsworth, Calif.

[73] Assignee: Jim O'Neal Distributing, Inc., Chatsworth, Calif.

[21] Appl. No.: 517,584

[22] Filed: May 1, 1990

[51] Int. Cl.[5] ............................................. A47B 96/06
[52] U.S. Cl. ................................. 248/230; 74/551.1; 403/191; 403/235
[58] Field of Search ............... 248/230, 231; 403/191, 403/235, 236, 344; 74/551.1, 551.8

[56] References Cited

U.S. PATENT DOCUMENTS

| | | | |
|---|---|---|---|
| 1,445,995 | 2/1923 | Carlson | 74/551.8 |
| 1,738,855 | 12/1929 | Thompson | 74/551.1 |
| 2,505,648 | 4/1950 | Pawsat | 74/551.1 X |
| 3,092,407 | 6/1963 | Blonder | 403/191 |
| 3,312,493 | 4/1967 | Olander | 403/191 X |
| 3,414,223 | 12/1968 | Pawsat | 248/230 |
| 3,650,544 | 3/1972 | Cassell | 248/230 X |
| 4,063,701 | 12/1977 | Wray | 248/230 X |
| 4,250,770 | 2/1981 | Robertson, Jr. | 74/551.8 |
| 4,513,923 | 4/1985 | Ulics | 248/230 X |

Primary Examiner—Gary L. Smith
Assistant Examiner—Michael Milano
Attorney, Agent, or Firm—Poms, Smith, Lande & Rose

[57] ABSTRACT

A mounting bracket used to mount a crossbar on a handlebar of a bicycle, motorcycle or similar vehicle. Two of the mounting brackets, one at each end of a crossbar, are used to mount the crossbar on a handlebar. Each mounting bracket has a sleeve portion that fits around the handlebar. The sleeve portion is clamped to the handlebar by a first bolt passing through apertures in clevis arms extending outward from the sleeve portion that are integrally formed with the sleeve portion. The crossbar has a lug at each end thereof. Each lug of the crossbar is secured between the clevis arms of a corresponding one of the mounting brackets by a second bolt that passes through apertures in the clevis arms and the lug. The first bolt is located between the end of the lug and the handlebar, and the second bolt is located between the end of the lug and the ends of the clevis arms. As such, the first bolt is used to clamp the sleeve portion of the bracket to the handlebar and the second bolt is used to secure a corresponding crossbar lug to the clevis arms of the bracket. The sleeve portion is of a predetermined thickness and has arcuate-shaped grooves therein that provide flexibility in order to facilitate clamping the sleeve portion around the handlebar. Apertures or slots passing through the sleeve portion may be used to provide flexibility instead of grooves.

20 Claims, 2 Drawing Sheets

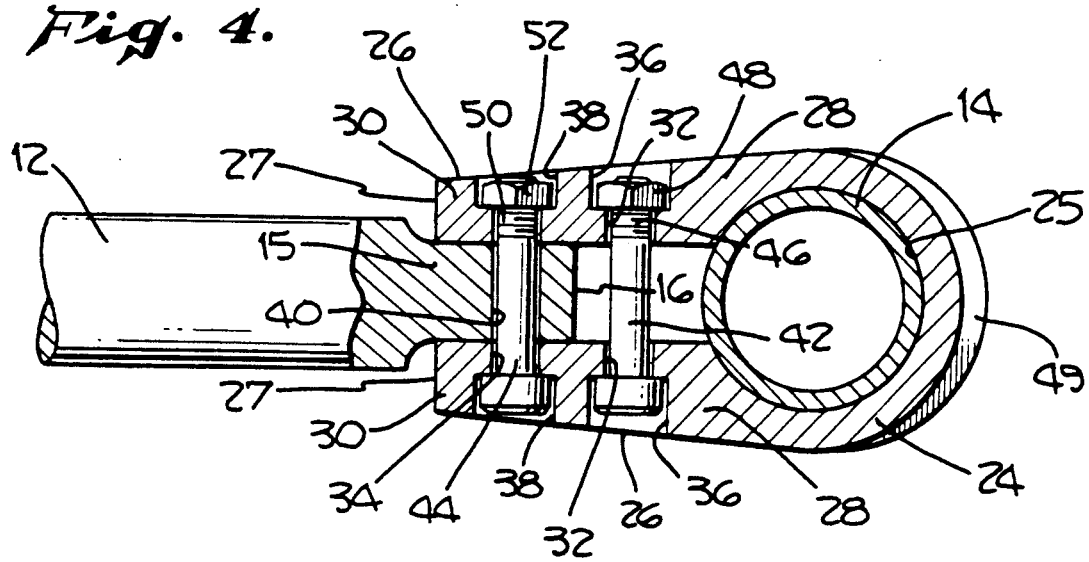
Fig. 4.
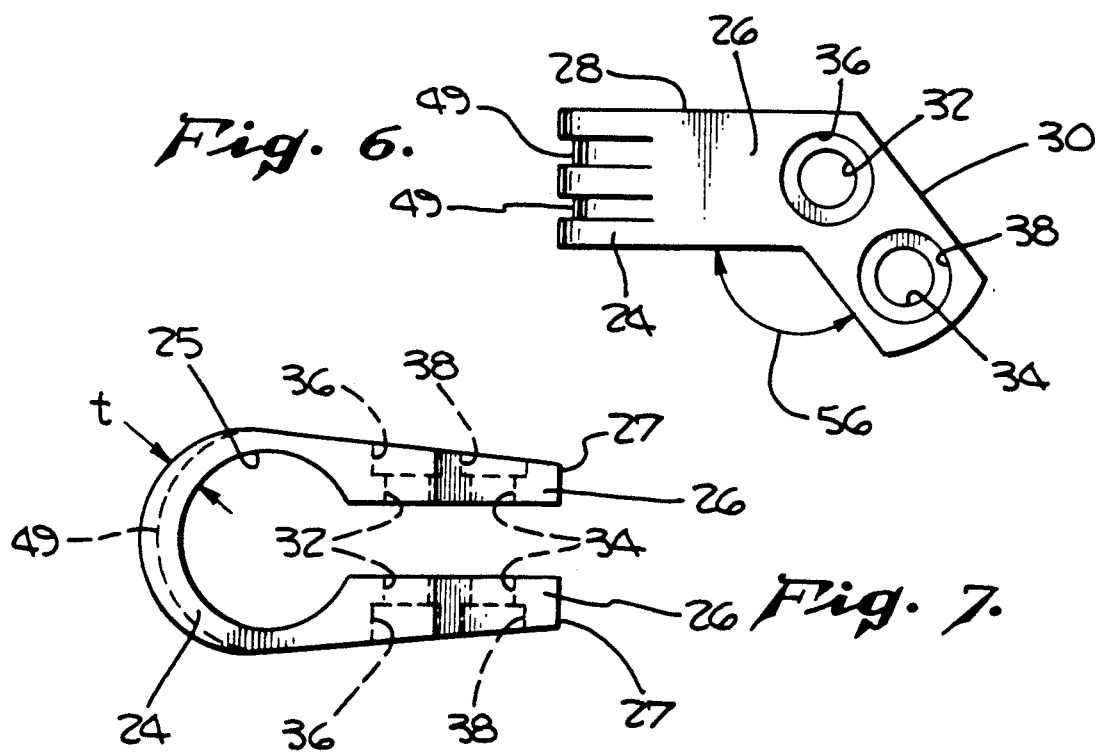
Fig. 5.
Fig. 6.
Fig. 7.

MOUNTING BRACKET FOR HANDLEBAR CROSSBAR

BACKGROUND OF THE INVENTION

The present invention relates generally to mounting brackets and, more particularly, to a mounting bracket that mounts a crossbar on the handlebar of a bicycle, motorcycle or similar vehicle by utilizing two bolts so that the bracket is firmly clamped to the handlebar and the crossbar is secured to the bracket.

In the past, different fastening or mounting devices have been used to mount a crossbar on the handlebar of a bicycle, motorcycle or similar vehicle. It is important to securely mount a crossbar on a handlebar in order to provide sufficient support so that the handlebar will not bend or flex during ordinary operation of a bicycle or motorcycle. Mounting brackets using only a single bolt have been utilized in the past, but do not adequately clamp both crossbar and handlebar members due to the tolerances of the brackets and of the lugs at the ends of the crossbar. As a result, the bracket may come loose from the handlebar or the crossbar may move or rotate with respect to the bracket due to forces encountered during operation of a bicycle or motorcycle, failing to provide support for the handlebar when needed.

SUMMARY OF THE INVENTION

It is an object of this invention to provide a mounting bracket for a handlebar crossbar which uses two bolts to securely clamp the bracket to a handlebar and the crossbar to the bracket.

It is another object of the invention to provide a mounting bracket for a handlebar crossbar that prevents the crossbar from moving or rotating with respect to the bracket.

It is still another object of this invention to provide a mounting bracket for a handlebar crossbar that may be used for different size handlebars.

These and other objects and advantages are attained by a mounting bracket for a handlebar crossbar that mounts the crossbar on the handlebar of a bicycle, motorcycle or similar vehicle. Two of the mounting brackets, one at each end of a crossbar, are used to mount the crossbar on a handlebar. Each mounting bracket has a sleeve portion that fits around the handlebar.

The sleeve portion is clamped to the handlebar by a first bolt passing through apertures in clevis arms extending outward from the sleeve portion that are integrally formed with the sleeve portion. The crossbar has a lug at each end thereof. Each lug of the crossbar is secured between the clevis arms of a corresponding one of the mounting brackets by a second bolt that passes through apertures in the clevis arms and the lug. The first bolt is located between the end of the lug and the handlebar, and the second bolt passes through the legs and is located between the end of the lug and the ends of the clevis arms.

In applicant's mounting bracket, the first bolt is used to clamp the sleeve portion of the bracket to the handlebar and the second bolt is used to secure a corresponding crossbar lug to the clevis arms of the bracket. The sleeve portion is of a predetermined thickness and has arcuate-shaped grooves therein that provide flexibility in order to facilitate clamping the sleeve portion around the handlebar. Apertures or slots passing through the sleeve portion may be used to provide flexibility instead of grooves.

The various features of the present invention will be best understood together with further objects and advantages by reference to the following description of the preferred embodiment taken in conjunction with the accompanying drawings.

BRIEF DESCRIPTION OF THE DRAWINGS

FIG. 4 is a cross-sectional view taken in the direction of arrows 4—4 shown in FIG. 3;

FIG. 5 is a side elevational view of the mounting bracket of FIG. 3;

FIG. 6 is a side elevational view of another embodiment of the mounting bracket; and FIG. 7 is a top plan view of the mounting bracket of FIG. 5.

DESCRIPTION OF THE PREFERRED EMBODIMENTS

The following specification taken in conjunction with the drawings sets forth the preferred embodiments of the present invention in such a manner that any person skilled in the art can make and use the invention. The embodiments of the invention disclosed herein are the best modes contemplated by the inventor for carrying out his invention in a commercial environment, although it should be understood that various modifications can be accomplished within the parameters of the present invention.

Figure 1:
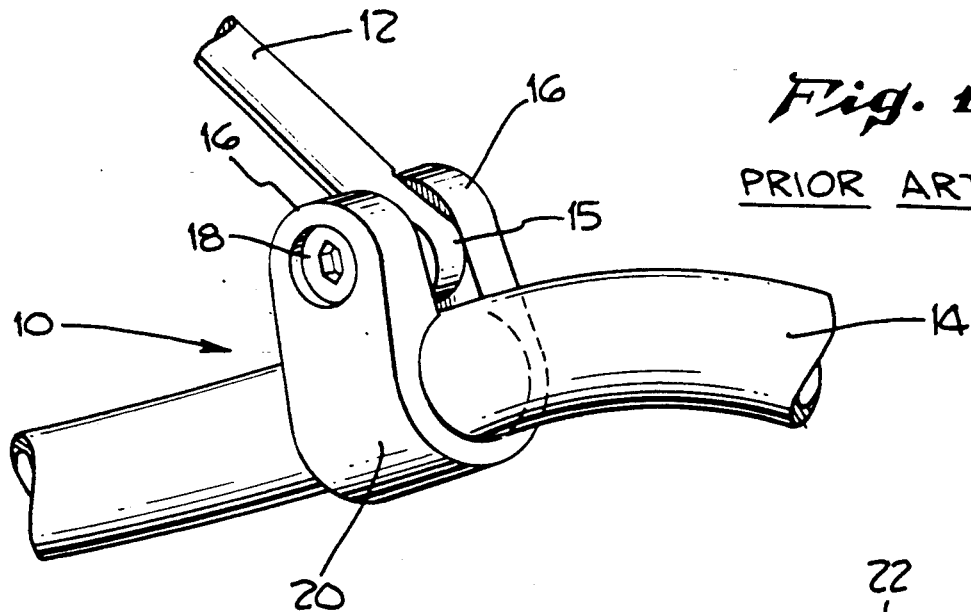
FIG. 1 is a perspective view of a prior art mounting bracket for a handlebar crossbar showing how one end of a crossbar is mounted on a handlebar.

FIG. 1 shows a prior art mounting bracket 10 used for a handlebar crossbar 12 of a bicycle, motorcycle or similar vehicle. The bracket 10 is used to mount the crossbar 12 on a handlebar 14. It is important that the crossbar 12 be securely mounted on the handlebar 14 in order to provide adequate support for the handlebar 14 during operation of a bicycle or motorcycle. The bracket 10 has clevis arms 16 through which a bolt 18 passes. The bolt 18 also passes through lug 15 of the crossbar 12 and is used in conjunction with a screw (not shown) to clamp the arms 16 to lug 15 of crossbar 12 for the purpose of securing the crossbar 12 to the bracket 10. The bracket also has a sleeve portion 20 which fits around the handlebar 14. Tightening of the bolt 18 also causes the sleeve portion 20 to clamp around the handlebar 14.

Since the bolt 18 is used to both secure the crossbar 12 to the bracket 10 and clamp the bracket 10 to the handlebar 14, tolerances associated with the lug 15, bolt 18, bracket 10 and/or handlebar 14 often prevent the bolt from adequately performing both functions, i.e., securing the crossbar 12 to the bracket 10 and clamping the bracket 10 to the handlebar 14. As a result, the bracket 10 may come loose from the handlebar 14 or the crossbar 12 may move or rotate with respect to the bracket 10 during normal operation of a bicycle or motorcycle. Therefore, the handlebar 14 may not be adequately supported by the crossbar 12 and may bend or flex during normal use.

Figure 2:
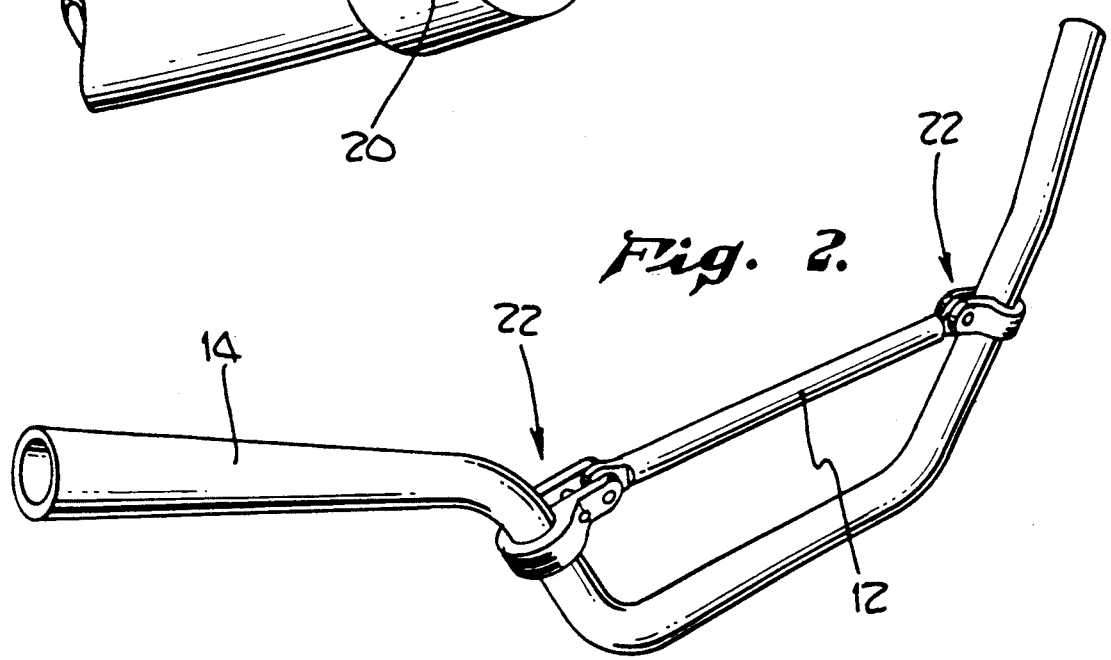
FIG. 2 is a perspective view showing two mounting brackets of the present invention mounting a crossbar on a handlebar.
Figure 3:
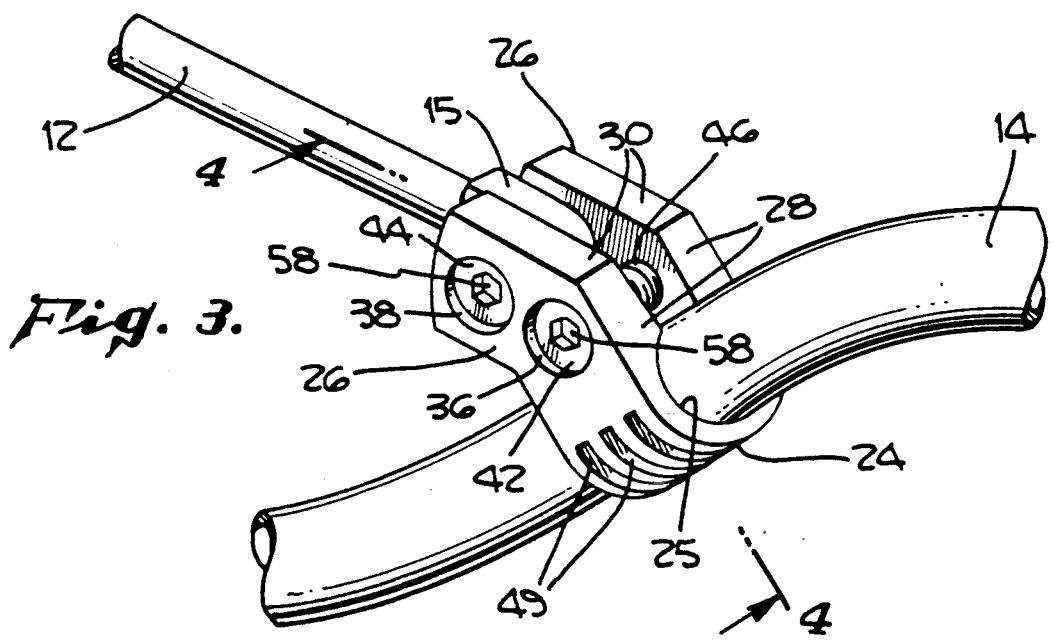
FIG. 3 is a detailed perspective view of one of the mounting brackets of FIG. 2.

FIGS. 2 through 5 and 7 show a preferred embodiment of a mounting bracket 22 of the present invention used to mount handlebar crossbar 12 on handlebar 14. Two of the mounting brackets 22 are shown in FIG. 2 mounting the ends of the crossbar 12 on the handlebar 14. As shown in FIGS. 3 and 4, mounting bracket 22 has a sleeve portion 24 with inside diameter 25 which fits around the handlebar 14. Clevis arms 26 extend outward from sleeve portion 24 and are integrally formed with portion 24. As shown, arms 26 have straight arm portions 28 and angled arm portions 30. Apertures 32 and 34 pass through the clevis arms 26 as shown in FIG. 4 and have counterbores 36 and 38, respectively, at the ends thereof. Apertures 32 are located between end 16 of lug 15 and the handlebar 14, and apertures 34 are located between end 16 and ends 27 of clevis arms 26. Countersinks (not shown) or other shaped holes may be used instead of counterbores 36 and 38, if desired. Lugs 15 of crossbar 12 have apertures 40 passing therethrough.

A bolt 42 engages apertures 32 in clevis arms 26 and has threaded end 46 which engages nut 48. As bolt 42 is threaded into nut 48 and tightened, straight arm portions 28 of clevis arms 26 are forced toward each other, causing sleeve portion 24 to tighten around the handlebar 14. As such, bolt 42 may be tightened until sleeve portion 24 is securely clamped around the handlebar 14. Sleeve portion 24 is of a predetermined thickness (see FIG. 7) sized or dimensional to provide flexibility thereof, and has arcuate-shaped grooves 49 therein as shown, which further increase the flexibility of portion 24 facilitating clamping sleeve portion 24 around the handlebar 14. Any type or shape of suitable grooves may be used instead of grooves 49, if desired. Alternatively, apertures or slots (not shown) passing through sleeve portion 24 may be used instead of grooves 49 to provide flexibility.

Another bolt 44 engages apertures 34 in clevis arms 26 and aperture 40 in lug 15 and has threaded end 50 which engages nut 52. Head of bolt 44 and nut 52 fit into counterbores 38. Preferably bolts 42 and 44 have sockets or recessed areas 58 (see FIG. 3) with appropriate internal surfaces which may be used to tighten the bolts with an allen wrench or some other tool.

Any type of suitable fastener or fastening device or means may be used instead of bolts 42 and 44 and nuts 48 and 52. For example, rivets, welds or clamps may be used, or a bolt or screw (not shown) may be used with a threaded sleeve (not shown) instead of a nut.

As discussed above, bolt 42 may be used to securely clamp sleeve portion 24 of the mounting bracket 22 to the handlebar 14, while bolt 44 may be used to secure lug 15 of crossbar 12 to the bracket 22. As a result, two of brackets 22 may be securely attached to the handlebar 14 and used to mount crossbar 12 to the handlebar 14 as shown in FIG. 2.

FIG. 5 shows a preferred embodiment of the mounting bracket 22 having angled arm portions 30 at an angle 54 of about 153 degrees with respect to straight arm portions 28.

Another embodiment of the mounting bracket 22 is shown in FIG. 6. In this embodiment, the angled arm portions 30 make an angle 56 of about 129 degrees with the straight arm portions 28. It is important to note that the angled arm portions 30 may be fabricated at any desirable angle from the straight arm portions 28, or to fit any size handlebar 14 for any bicycle, motorcycle or other vehicle. As such, applicant's mounting bracket 22 is intended to be used with a variety of different size handlebars 14.

The above description discloses the preferred embodiments of the present invention. However, persons of ordinary skill in the art are capable of numerous modifications once taught these principles. Accordingly, it will be understood by those skilled in the art that changes in form and detail may be made to the above-described embodiments without departing from the spirit and scope of the invention.

I claim:

1. A mounting bracket used to mount a crossbar to a handlebar, said crossbar having a lug at each end thereof with an aperture passing through each of said lugs, comprising:

a sleeve portion removably fitting around said handlebar;

clevis arms integrally formed with said sleeve portion and extending from said sleeve portion, said clevis arms having first and second pairs of apertures passing therethrough and integrally formed straight arm portions and angled arm portions, said angled arm portions being at an angle with respect to said straight arm portions, said angle selected so that said mounting bracket is adapted to fit said crossbar and said handlebar;

first fastening means engaging said first pair of apertures in said clevis arms for removably clamping said sleeve portion to said handlebar; and second fastening means engaging said second pair of apertures in said clevis arms and said aperture in a corresponding one of said lugs of said crossbar for removably securing said one lug between said clevis arms.

2. The mounting bracket of claim 1 wherein each of said first and second fastening means comprises a bolt threaded into a nut.

3. The mounting bracket of claim 1 wherein said first fastening means is located between said handlebar and an end of said one lug.

4. The mounting bracket of claim 3 wherein said second fastening means is located between said end of said one lug and ends of said clevis arms.

5. The mounting bracket of claim 4 wherein each of said first and second fastening means comprises a bolt threaded into a nut.

6. The mounting bracket of claim 5 wherein said sleeve portion has arcuate-shaped grooves therein.

7. The mounting bracket of claim 6 wherein said clevis arms have counterbores therein, each of said counterbores for a corresponding one of said nuts and said bolts.

8. The mounting bracket of claim 7 wherein said angle between said angled arm portions and said straight arm portions is about 129 degrees.

9. The mounting bracket of claim 7 wherein said angle between said angled arm portions and said straight arm portions is about 153 degrees.

10. A mounting bracket used to mount a crossbar to a handlebar, said crossbar having a lug at each end thereof with an aperture passing through each of said lugs, comprising:

a sleeve portion removably fitting around said handlebar, said sleeve portion being of a predetermined thickness facilitating flexibility thereof;

clevis arms integrally formed with said sleeve portion and extending from said sleeve portion, said clevis arms having apertures passing therethrough, said clevis arms adapted to removably engage a corresponding one of said lugs of said crossbar so that said one lug fits between said clevis arms, said clevis arms having integrally formed straight arm portions and angled arm portions, said angled arm portions being at an angle with respect to said straight arm portions, said angle selected so that said mounting bracket is adapted to fit said crossbar and said handlebar;

a first fastener engaging a corresponding pair of said apertures in said clevis arms and located between said handlebar and an end of said one lug so that said sleeve portion is removably clamped around said handlebar; and a second fastener engaging another corresponding pair of said apertures in said clevis arms and said aperture in said one lug, and located between said end of said one lug and ends of said clevis arms so that said one lug is removably secured between said clevis arms.

11. The mounting bracket of claim 10 wherein said sleeve portion has means for providing flexibility therefor to facilitate clamping said sleeve portions to said handlebar.

12. The mounting bracket of claim 11 wherein said clevis arms have counterbores therein, each of said counterbores for a corresponding one of said first and second fasteners.

13. The mounting bracket of claim 12 wherein said angle between said angled arm portions and said straight arm portions is about 129 degrees.

14. The mounting bracket of claim 12 wherein said angle between said angled arm portions and said straight arm portions is about 153 degrees.

15. A mounting bracket used to mount a crossbar to a handlebar, said crossbar having a lug at each end thereof with an aperture passing through each of said lugs, comprising:

a sleeve portion removably fitting around said handlebar, said sleeve portion having grooves therein;

clevis arms integrally formed with said sleeve portion and extending outwardly from said sleeve portion, said clevis arms having apertures passing therethrough and counterbores at ends of said apertures, said clevis arms adapted to removably engage a corresponding one of said lugs of said crossbar so that said one lug fits between said clevis arms, said clevis arms including integrally formed straight arm portions and angled arm portions, said angled arm portions being at an angle with respect to said straight arm portions;

a first bolt engaging a corresponding pair of said apertures in said clevis arms and located between said handlebar and an end of said one lug, said first bolt having a head adapted to fit into a corresponding one of said counterbores in said clevis arms;

a first nut adapted to fit into a corresponding one of said counterbores in said clevis arms and adapted to engage said first bolt so that said sleeve portion is removably clamped around said handlebar;

a second bolt engaging a corresponding pair of said apertures in said clevis arms and said aperture in said one lug and located between said end of said one lug and ends of said clevis arms, said second bolt having a head adapted to fit into a corresponding one of said counterbores in said clevis arms; and a second nut adapted to fit into a corresponding one of said counterbores in said clevis arms and adapted to engage said second bolt so that said one lug is removably secured between said clevis arms.

16. A combination of crossbar and mounting brackets for use with a handlebar comprising:

a crossbar having a lug at each end thereof, each of said lugs having an aperture passing therethrough; and two mounting brackets, each of said mounting brackets removably secured to one of said lugs of said crossbar, each of said mounting brackets including:

(a) a sleeve portion removably fitting around said handlebar, (b) clevis arms integrally formed with said sleeve portion and extending from said sleeve portion, said sleeve portion, said clevis arms having first and second pairs of apertures passing therethrough and integrally formed straight arm portions and angled arm portions, said angled arm portions being at an angle with respect to said straight arm portions, said angle selected so that said mounting bracket is adapted to fit said crossbar and said handlebar, (c) first fastening means engaging said first pair of apertures in said clevis arms for removably clamping said sleeve portion to said handlebar, and (d) second fastening means engaging said second pair of apertures in said clevis arms and said aperture in a corresponding one of said lugs of said crossbar for removably securing said one lug between said clevis arms.

17. The combination of crossbar and mounting brackets of claim 16 wherein each of said first and second fastening means comprises a bolt threaded into a nut.

18. The combination of crossbar and mounting brackets of claim 17 wherein said first fastening means is located between said handlebar and an end of said one lug.

19. The combination of crossbar and mounting brackets of claim 18 wherein said second fastening means is located between said end of said one lug and ends of said clevis arms.

20. The combination of crossbar and mounting brackets of claim 19 wherein said sleeve portion has groves therein providing flexibility therefor.

* * * * *